Patented Apr. 3, 1951

2,547,498

UNITED STATES PATENT OFFICE 2,547,498

POLYMERIC IMIDO-ESTERS PREPARED FROM MALEIC ADDUCTS OF FATTY ACID ESTERS AND BIS-AZOLINES

Stanley P. Rowland, Philadelphia, Pa., assignor to Rohm & Haas Company, Philadelphia, Pa., a corporation of Delaware No Drawing. Application March 8, 1950, Serial No. 148,515

10 Claims. (Cl. 260—18)

1

This invention relates to a new class of imido-esters and to a process for preparing them.

The products of this invention are polymeric and often resinous imido-esters of high molecular weight. They are made by reacting bis-azolines; that is, bis-oxazolines or bis-thiazolines with maleic anhydride-adducts of the esters of nonconjugated, nonhydroxylated, unsaturated, aliphatic, carboxylic acids, which acids contain 10 to 24 carbon atoms.

It is known that maleic anhydride, as well as other alpha,beta-unsaturated anhydrides of dicarboxylic acids, such as citraconic anhydride, combines with the esters of nonconjugated, nonhydroxylated, unsaturated fatty acids, presumably at the double bonds, to form compounds known as maleic-adducts or maleic anhydride-adducts. As a result of this combination, anhydride groups are introduced into the fatty acid portion of the ester and the number of such added anhydride groups depends primarily upon the degree of unsaturation of the esterified fatty acid and the amount of maleic anhydride employed. Thus, for example, only one anhydride group can be added to each molecule of methyl oleate whereas more than one can be added to such esters as ethylene glycol dioleate, ethyl linolenate, glyceryl linolenate, pentaerythrityl undecenoate. Ordinarily, it becomes increasingly difficult to add each successive anhydride group but adducts can be readily prepared which contain up to at least two anhydride groups on each radical of esterified polyunsaturated acid.

This invention is not drawn to the preparation of the maleic-adducts since methods of making them are already well-established (cf. U. S. Patents Nos. 2,188,882 to 2,188,890 inclusive; "Paint, Oil and Chemical Review," vol. 112, No. 14 (July 7, 1949), p. 20; "Journal of American Oil Chemists' Soc.," vol. XXVI, No. 11 (Nov. 1949), pp. 660–63 and vol. XXV, No. 5 (May 1948), pp. 158–62 and the bibliographies therein). Thus, for example, they are prepared by heating an ester of an unsaturated acid with maleic anhydride for about three to six hours at about 200° C.

This invention is, however, drawn to the reaction of those maleic-adducts with bis-azolines to form new and distinctive polymeric imido-esters. The bis-azolines which react with the maleic-adducts have the general formula

2

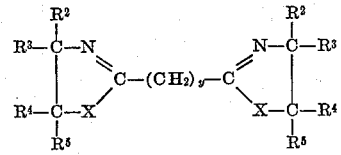

in which $y$ is an integer of value four to eight inclusive; X represents an atom of oxygen or sulfur; and the characters $R^2$, $R^3$, $R^4$ and $R^5$ represent hydrogen atoms or monovalent organic radicals preferably hydrocarbon radicals. Reaction takes place between the bis-azolines and the anhydride groups which are present in the maleic-adducts according to the following schematic representation in which the anhydride portion of the adduct is shown as

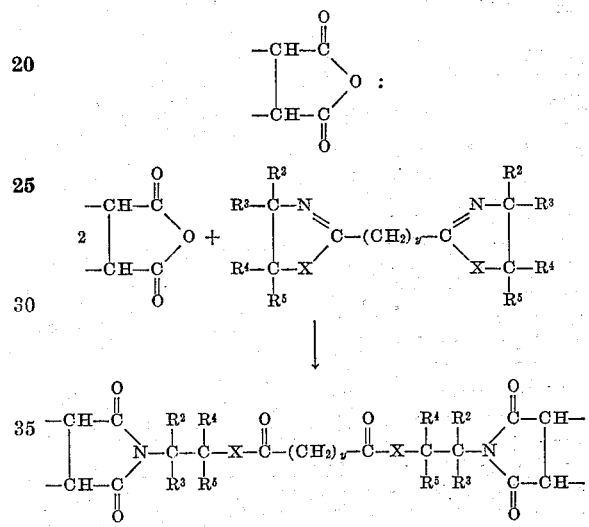

It should be noted that each molecule of a bis-azoline is capable of reacting with two anhydride groups. Thus a bis-azoline has a functionality of two in the process of this invention.

As regards the adducts, it is apparent that their functionality is determined by the number of anhydride groups which they contain in each molecule. An adduct of an ester such as methyl oleate has a functionality of one insofar as reactivity with a bis-azoline is concerned. The adduct of two moles of maleic anhydride to one mole of ethylene glycol dilinoleate has a functionality of two, for example, and the adduct of three moles of maleic to one mole of soybean oil has a functionality of three on the same basis. An adduct can have a functionality even greater than three as is the case when several moles of maleic anhydride are reacted with a mole of an ester of a polyhydric alcohol and a polyunsaturated acid such as pentaerythrityl linolenate. In addition, it must be borne in mind that any free double bonds in an adduct can give rise to polymerization of the adduct which automatically yields a polymer having much higher functionality.

The functionality of the adducts is of utmost importance because it determines the properties of the imido-esters which are produced by the reaction of the adducts with the bis-azolines. Thus depending upon the functionality of the adduct, products ranging from soluble, dimeric imido-esters through thermoplastic and soluble resinous imido-esters up to insoluble and infusible thermoset imido-esters are produced by the process of this invention. For example, when a difunctional bis-azoline reacts with a monofunctional adduct, such as the adduct of methyl oleate, one molecule of the bis-azoline reacts with an anhydride group in each of two molecules of the adduct and this joins them together in what may be considered a dimeric imido-ester. Difunctional adducts can react with bis-azolines in more than one way. For instance, one molecule of bis-azoline can react with two anhydride groups in the same molecule of adduct or with one anhydride group in each of two molecules of a difunctional adduct. In the latter case, the product is a linear polymer. Thus, reaction of the bis-azoline can be intra-molecular—within the molecule, or inter-molecular—between the molecules. The latter ordinarily takes place to a greater extent than the former. When a bis-azoline reacts with an adduct having a functionality greater than two it serves as a cross-linking agent and gives rise to cross-linked polymers which are three-dimensional and hence very complex, and which are thermosetting in the sense that continued heating and reaction causes them to become gelled masses or insoluble and infusible products.

The maleic-adducts with which the bis-azolines react by the process of this invention are those prepared by reacting maleic anhydride with an ester of a nonhydroxylated, nonconjugated, unsaturated, aliphatic, carboxylic acid and a monohydric or a polyhydric alcohol. The maleic-adducts are made by well-known processes such as those set forth in U. S. Patent No. 2,188,882 and in the literature cited above to which reference is hereby made. Following is a list of typical acids, the adducts of whose esters react by the process of this invention: iso-decenoic, undecenoic, myristolenic, palmitolenic, oleic, iso-oleic, petroselic, erucic, brassidic, erucylacetic, geranic, linoleic, linolenic and clupanodonic acids. Following is a list of typical alcohols, the adducts of whose esters with the acids exemplified above react with the bis-azolines to form new imido-esters: methyl, ethyl, isopropyl, sec.-butyl, tert.-amyl, n-hexyl, 2-ethylhexyl, lauryl, octadecyl alcohols and the isomers of these; benzyl, p-butylbenzyl, cyclohexyl and the like; ethylene glycol, diethylene glycol, 1,6-hexandiol, butylene glycol; glycerol; pentaerythritol and the like. Thus, the reaction of the adducts of the esters of the unsaturated acids and polyhydric alcohols as well as monohydric alcohols is embraced by the reaction of this invention. In fact, a particularly preferred class of imido-esters are those made by reacting bis-azolines with maleic-adducts of vegetable or animal oils which are actually glyceryl esters of mixtures of saturated and unsaturated acids. The maleic-adducts of the following oils are operable: corn, olive, cottonseed, peanuts, sunflower, linseed, safflower, hempseed, walnut, soybean, rapeseed, poppyseed, sesame and perilla, as well as neat's-foot, salmon and whale oils.

In order for the compounds to be classed as operable maleic-adducts, they must obviously contain at least one anhydride group in each molecule. But there are many operable adducts which contain more than one such group in each molecule since the number of anhydride groups which can be added to an ester is proportional to the number of double bonds in all of the radicals of the esterified acids. Thus, as indicated above, while only one anhydride group can be present in each molecule of the adduct of an oleic acid ester of a monohydric alcohol, there can be many more groups in each molecule of an adduct such as that of glyceryl linolenate. And each anhydride group in a molecule of an adduct is capable of reacting with one of the two functional groups in each molecule of a bis-azoline. So long as an adduct of an ester contains one anhydride group, it is not necessary that it contain its maximum potential number of anhydride groups in order to be operable, and, in fact, it is often desirable, as in the case of oil-adducts, to have present fewer than the maximum number of anhydride groups so that the adduct will be free to polymerize on being heated. With this in mind, and in view of the fact that bis-azolines are cross-linkers, the maximum number of anhydride groups in a molecule of any adduct should not exceed six regardless of the degree of unsaturation of the original ester. Thus, the operable adducts are those of the esters of monohydric and polyhydric alcohols described above and the unsaturated fatty acids described above, which adducts contain from one to six anhydride groups in each molecule.

The bis-oxazolines and bis-thiazolines which react with the maleic-adducts are known but it was not known heretofore to make new polymeric imido-esters of high molecular weight by reacting the bis-azolines with the adducts. All of the reactive bis-azolines have the general formula given above. It is to be noted that the groups represented by $R^2$, $R^3$, $R^4$, $R^5$ and X, as well as the value of $y$, are not altered, but rather remain intact and unchanged during the reactions between the adducts and bis-azolines.

So that no interfering side-reactions can take place, it is desirable that the organic radicals which are represented by the R's be unreactive with acid anhydrides. Thus, it is desirable that they be free of such substituents as hydroxyl groups and amino-hydrogen atoms. Whether or not a particular substituent is reactive with acid anhydrides is well within the knowledge of one skilled in chemistry. This is not to be taken as meaning that a bis-azoline containing a hydroxyl group or amino-hydrogen atom is not operable in the process of this reaction but that the reaction of such compounds is less efficient due to the competition of these substituents and the azoline per se for the anhydride. It is much preferred that the radicals which are represented by the R's be hydrocarbon radicals such as alkyl, aryl, aralkyl, alkaryl and cycloalkyl. The following list includes examples of such suitable hydrocarbon radicals; methyl, ethyl, isopropyl, sec.-butyl, tert.-butyl, 2-ethylhexyl, lauryl, n-tetradecyl, and octadecyl groups and the isomers of these groups; phenyl, tolyl, benzyl, p-octylphenyl, m-xylyl, 2,4-di-tert.-amylphenyl, cyclohexyl and naphthyl groups. Although those bis-azolines are preferred in which the substituents represented by the R's are hydrocarbon radicals, it is a fact that the maleic adducts react readily and satisfactorily with bis-azolines in which the substituents $R$'s$^{2 \text{ to } 5}$ also contain other elements in addition to carbon and hydrogen. Thus, halogen groups can be present as well as nitro, ether, keto, aldehydo, sulfonic, and tertiary amino groups. None of these groups reacts with the acid anhydrides and none interferes with the reaction of the maleic-adduct with the bis-oxazolines or bis-thiazolines.

Suitable and operable bis-azolines; that is, both bis-oxazolines and bis-thiazolines, include the following by way of example:

1,4-tetramethylene bis-azolines;
1,4-tetramethylene-bis-2-(5-methylazolines);
1,8-octamethylene bis-azolines;
1,5-pentamethylene-bis-2-(5-ethylazolines);
1,6-hexamethylene-bis-2-(5-phenylazolines);
1,7-heptamethylene-bis-2 - (5 - p - chlorophenylazolines);
1,8-octamethylene-bis-2-(4,5-dimethylazolines);
1,8-octamethylene-bis-2-(5,5-dimethylazolines);
1,7-heptamethylene - bis - 2 - (4,4,5 - triethylazolines);
1,5-pentamethylene-bis- 2 - (4,4,5,5-tetramethylazolines);
1,4-tetramethylene-bis-2-(5-naphthylazolines);
1,4-tetramethylene-bis-2 - (5 - chloromethylazolines);
1,5-pentamethylene-bis-2-(5-benzylazolines);
1,6-hexamethylene-bis - 2 - (5-p-nitrophenylazolines);
1,4-tetramethylene-bis- 2 - (5 - diethylaminoazolines);
1,4-tetramethylene - bis - 2 - (5-diisobutylaminoazolines);
1,6-hexamethylene-bis - 2 - (5 - phenyl-5-methylazolines);
1,4-tetramethylene-bis-2-(4 - methyl-4-ethylazolines);
1,4-tetramethylene-bis - 2 - (4-methyl-5-phenylazolines);
1,4-tetramethylene-bis-2-(4,4-dibenzylazolines);
1,6-hexamethylene-bis-2-(4,5-dipropylazolines);
1,6-hexamethylene - bis - 2 - (4,4 - dibutyl -5-isopropylazolines);
1,7-heptamethylene-bis-2-(4-naphthylazolines);
1,8-octamethylene-bis-2-(5-tolylazolines)

and the like.

The reaction between the bis-azolines and the adducts takes place readily. Reaction occurs even at room temperature (ca. 20° C.) especially when an adduct and a bis-azoline are dissolved in a volatile solvent and are deposited as a thin film. Heating of the reactants accelerates the rate of reaction and for this reason a minimum of 150° C. is recommended. Temperatures up to 300° C. are operable but an upper temperature of 250° C. is much preferred. It has also been found that in general it is advantageous to maintain as low temperature of reaction as is feasible when the biz-azoline carries two substituents, such as alkyl groups, in the positions occupied by $R^4$ and $R^5$ in the general formula above. In such cases a maximum temperature of about 150° C. is suggested. When the resinous product is to be isolated in bulk, the reactants are combined in a reactor; but this is not always necessary. For example, a solution of a mixture of reactants, particularly a combination which yields insoluble products, can be applied to an object which it is desired to coat and protect, and then the coated object can be baked in an oven. During the baking period, the reactants combine to form the new polymeric product as a firm coating on the object. Furthermore, mixtures of adducts and bis-azolines which react to form insoluble products can be blended with customary fillers, pigments and the like and molded directly under heat and pressure in a closed mold. This method of reacting and molding at the same time is quite satisfactory because no volatile product, such as water, is liberated by the reaction of the adduct and the biz-azoline.

For convenience, inert solvents can be employed. Likewise, catalysts such as alcoholates, zinc chloride and the like can be used, although ordinarily the reaction takes place rapidly enough in the absence of catalysts. Other expedients well known to those skilled in the art, such as variations in pressure, solvent extraction of the product, excess of one reactant, and the like, can be used without departing from the spirit of this invention which is one of preparing new resinous imido-esters by combining bis-oxazolines or bis-thiazolines as herein defined with the maleic anhydride-adducts of the esters of nonconjugated, nonhydroxylated fatty acids.

It is evident from the above discussion that one molecule of bis-azoline can combine with two anhydride groups in the adducts. Therefore, the course of the reaction is readily followed by titrating the reaction mixture with standard alkali since the alkali neutralizes the free and unreacted anhydride groups in the adduct.

While the reactants can combine in the ratio of one molecule of the bis-azoline to two anhydride groups, it is apparent that a higher ratio of either can be employed. When an excess of bis-azoline is present only one azoline ring—i. e. one functional group—will react, but the products will nevertheless be new and distinctive imido-esters. In some instances, such as in the case of the adducts of glyceryl and pentaerythritol esters, a small amount of reacted bis-azoline provides sufficient cross-links as to cause gelation or insolubilization. In those instances where it is desirable to employ less than enough bis-azoline to react with all of the anhydride groups in the adduct, the unreacted anhydride groups can be readily converted to salts, for example, by neutralization, or to esters by reaction with alcohols. Alternatively, some of the anhydride groups can be neutralized or esterified first, and the remainder then reacted with the bis-azoline.

The following examples are presented in order to illustrate—and not to limit—this invention. The reaction of the bis-azolines and bis-thiazolines with the maleic adducts is ordinarily complete after two to four hours of heating at about 125° C. to about 200° C. This new reaction provides a large class of new products which are actually all imido-esters but which differ from one another as to the particular adduct, as regards the amount of maleic anhydrides combined in the adduct, as regards the number of methylene groups joining the two azoline rings, and finally as regards the substituents, R's[2] to [5], on the bis-azoline. All of the bis-azolines and maleic-anhydride-adducts described herein, however, react by the same mechanism; and their reactions are typified by the following examples.

Example 1

An adduct of methyl oleate was made by heating 296 parts of methyl oleate and 98 parts of maleic anhydride at 280° C. for six hours. To this adduct was added 112 parts of 1,4-tetramethylene-bis-2-(5-methyloxazoline) and the mixture was stirred and heated in a flask for two hours at 190° C. The fluid product had an acid number of 5.1, indicating substantially complete reaction between the adduct and the bis-azoline.

Example 2

An adduct of butyl undecylenate was made by heating 100 parts of butyl undecylenate with 37.5 parts of maleic anhydride at 280° C. for six hours. One hundred grams of the resultant adduct was mixed with 82 grams of 1,8-octamethylene-bis-2-(5-methyloxazoline) and the mixture was then heated in a flask at 150° C. for four hours. The fluid product had an acid number of 7.0.

Example 3

An adduct of linseed oil was made by heating and stirring a mixture of one mole of refined linseed oil (880 parts) and three moles (294 parts) of maleic anhydride for 30 minutes at 150° C., then for 30 minutes at 200° C. and finally for four hours at 250° C. The adduct was a clear, viscous oil. A thousand parts of the product was merely mixed with 287 parts of 1,4-tetramethylene-bis-2-(5-methyloxazoline) and a portion of the product, a homogeneous solution, was tested as baked films on glass against corresponding films of the unmodified, refined linseed oil and of the linseed oil-maleic adduct. After a thirty minute bake at 150° C. the films of the polymeric imido-ester were tackfree and hard and resistant to solvents whereas the films of the unmodified adduct and especially the films of the untreated oil were soft, tacky and soluble in organic solvents.

Example 4

A portion of the mixture of linseed oil adduct and 1,4-tetramethylene-bis-2-(5-methyloxazoline), prepared by the process of Example 3 above, was heated in a flask at 115° C. for twenty minutes. Some of the viscous, resinous product was flowed on glass and allowed to dry in the air. The films became tackfree in two hours and had a hardness of 3B on the pencil scale after 24 hours. In comparison, films of the unmodified linseed oil-maleic adduct remained tacky for more than 24 hours. When cobalt drier was added to the product prepared as above in an amount equivalent to 0.05% cobalt metal the product dried even more rapidly and acquired a hardness of B in 24 hours of air-drying.

Example 5

A. An adduct of soybean oil was made by stirring and heating one mole of soybean oil and three moles of maleic anhydride at 250° C. for six hours. To this adduct was added 1.5 mole of 1,7-heptamethylene-bis-2-oxazoline and the reaction mixture was heated at 150° C. In one hour the reaction mixture had gelled to an insoluble mass.

B. In contrast, an adduct of one mole of soybean oil and one mole of maleic anhydride, prepared in the same way as described in A above, remained a soluble, viscous fluid when heated for 100 hours at 150° C. with 0.5 mole of the same 1,7-heptamethylene-bis-2-oxazoline, although its acid number fell to 6.0 in that time.

C. A mixture of 0.5 mole of the maleic-adduct of soybean oil prepared as described under A above and 0.75 mole of the same 1,7-heptamethylene-bis-2-oxazoline was prepared and films of the mixture on glass panels were baked for two hours at 150° C. During the bake, the films became insoluble and infusible.

Example 6

One mole of the ethylene glycol ester of a mixture of perilla oil fatty acids was converted into an adduct by reaction with two moles of maleic anhydride at 225° C. for six hours. A mixture of this adduct and one mole of 1,6-hexamethylene-bis-2-(5-phenyloxazoline) was heated for one hour at 125° C. The product was a thermoplastic resin which was soluble in xylene. The temperature was raised to 150° C. and in two hours the entire mass gelled. Gelation was attributed to the presence of esterified linoleic and linolenic acids in the ester of the mixed acids.

Example 7

Following the procedure of Example 5 above, an adduct of three moles of maleic anhydride and one mole of soybean oil was reacted with other bis-azolines in the ratio of 0.5 mole of bis-azoline to each mole of maleic anhydride combined in the adduct. Mixtures of the adduct and the individual bis-azolines were placed in beakers and were heated for three hours at 150° C. in an oven. In every case the product was a gelled, insoluble mass which indicated that the bis-azolines reacted in a similar manner and served as cross-linking agents. The bis-azolines which caused gelation were 1,4-tetramethylene-bis-2-(5-methylthiazoline); 1,8-octamethylene-bis-2-(5-phenylthiazoline); 1,6-hexamethylene-bis-2-(5 - p - nitrophenyloxazoline); 1,4 - tetramethylene-bis-2-(4,5 - dimethyloxazoline); 1,7-heptamethylene-bis - 2 - (4,5 - diethyloxazoline); 1,5-pentamethylene-bis-2-(4,4,5-trimethyloxazoline); and 1,8-octamethylene-bis-2-(5-isobutyloxazoline).

Ordinarily the insoluble products such as those prepared in Example 7 would not be prepared en masse or in bulk. The reaction which results in insoluble products, however, can be used to advantage in preparing molded objects by heating mixtures of bis-azolines and oil-adducts in a mold of desired shape. Also, as shown, mixtures of bis-azolines and adducts containing three or more anhydride groups in each molecule, particularly oil-adducts, can be applied to surfaces of objects which it is desired to coat and the object can be heated, as, for example, in an oven, and the reactive mixture thus converted chemically into an insoluble coating on the object.

The products of this invention are all imido-esters which, therefore, have unusual chemical configurations which make them valuable as intermediates for the production of other new compounds. In their own rights the products, which range from fluids to insoluble resins, have a wide variety of uses. Thus, they are eminently suited as plasticizers for synthetic resins and plastics, as modifiers for other surface-coating materials, and as film-forming and molding compositions themselves.

I claim:

1. A process for the preparation of an imido-ester, which comprises chemically reacting at a temperature of 20° C. to 300° C., (1) maleic anhydride-adducts of esters of nonconjugated, nonhydroxylated, olefinically unsaturated, aliphatic, carboxylic acids containing 10 to 24 carbon atoms, said adducts containing one to six anhydride groups per molecule, with (2) bis-azolines of the general formula

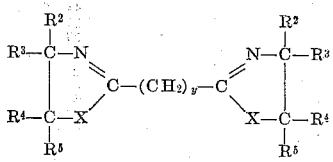

in which $y$ is an integer of value four to eight inclusive; X represents an atom of an element from the class consisting of oxygen and sulfur; $R^2$, $R^3$, $R^4$ and $R^5$ represent members of the class consisting of hydrogen atoms and alkyl, aryl, aralkyl, alkaryl, and cycloalkyl groups.

2. A process for the preparation of an imido-ester, which comprises chemically reacting at a temperature of 20° C. to 300° C., (1) a maleic anhydride-adduct of a nonconjugated, nonhydroxylated, olefinically unsaturated vegetable oil, said adduct containing one to six anhydride groups per molecule, with (2) bis-azolines of the general formula

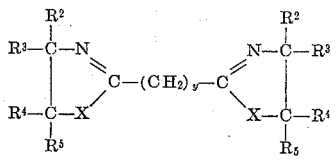

in which $y$ is an integer of value four to eight inclusive; X represents an atom of an element from the class consisting of oxygen and sulfur; $R^2$, $R^3$, $R^4$ and $R^5$ represent members of the class consisting of hydrogen atoms and alkyl, aryl, aralkyl, alkaryl, and cycloalkyl groups.

3. A process for the preparation of an imido-ester, which comprises chemically reacting at a temperature of 20° C. to 300° C., (1) a maleic anhydride-adduct of a drying oil, said adduct containing one to six anhydride groups per molecule, with (2) bis-azolines of the general formula

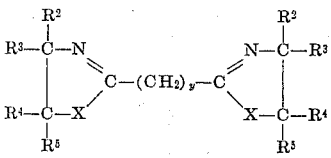

in which $y$ is an integer of value four to eight inclusive; X represents an atom of an element from the class consisting of oxygen and sulfur; $R^2$, $R^3$, $R^4$ and $R^5$ represent members of the class consisting of hydrogen atoms and alkyl, aryl, aralkyl, alkaryl, and cycloalkyl groups.

4. A process for the preparation of an imido-ester, which comprises chemically reacting at a temperature of 20° C. to 300° C., (1) a maleic anhydride-adduct of a drying oil, said adduct containing one to six anhydride groups per molecule, with (2) 1,4 - tetramethylene - bis - 2 - (5 - methyloxazoline).

5. A process for the preparation of an imido-ester, which comprises chemically reacting at a temperature of 20° C. to 300° C., (1) a maleic anhydride-adduct of a drying oil, said adduct containing one to six anhydride groups per molecule, with (2) 1,4 - tetramethylene - bis - 2 - (5 - methylthiazoline).

6. A composition of matter as prepared by the process of claim 1.

7. A composition of matter as prepared by the process of claim 2.

8. A composition of matter as prepared by the process of claim 3.

9. A composition of matter as prepared by the process of claim 4.

10. A composition of matter as prepared by the process of claim 5.

STANLEY P. ROWLAND.

No reference cited.